Feb. 23, 1971    L. W. BUTLER ET AL    3,565,521
VARIABLE SIZE FILM FRAMING AND TRANSPORT SYSTEM
Filed Nov. 26, 1968    4 Sheets-Sheet 1
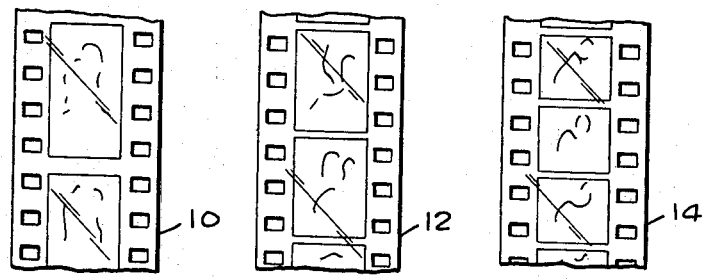
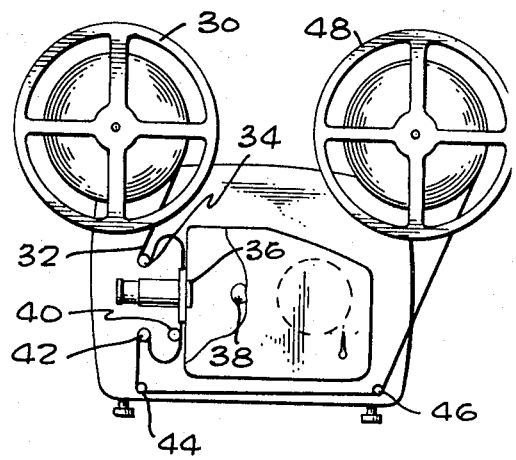
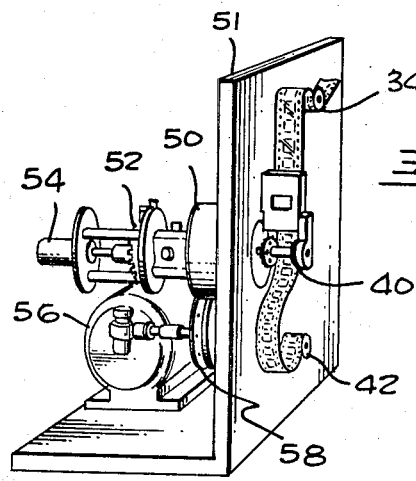
LAWRENCE W. BUTLER
ROGER W. BANKS
INVENTORS
BY Lindenberg & Freilich
ATTORNEYS

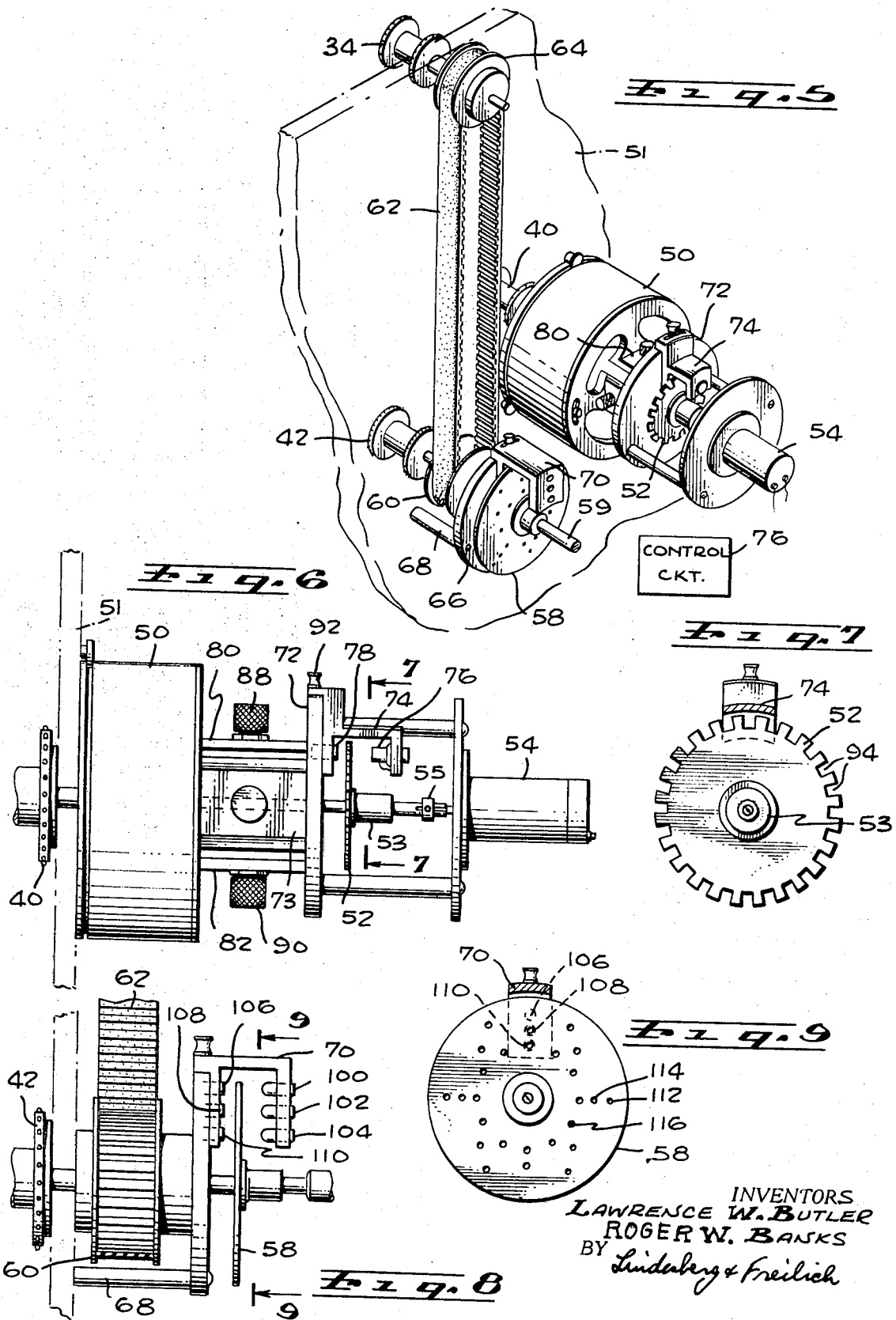

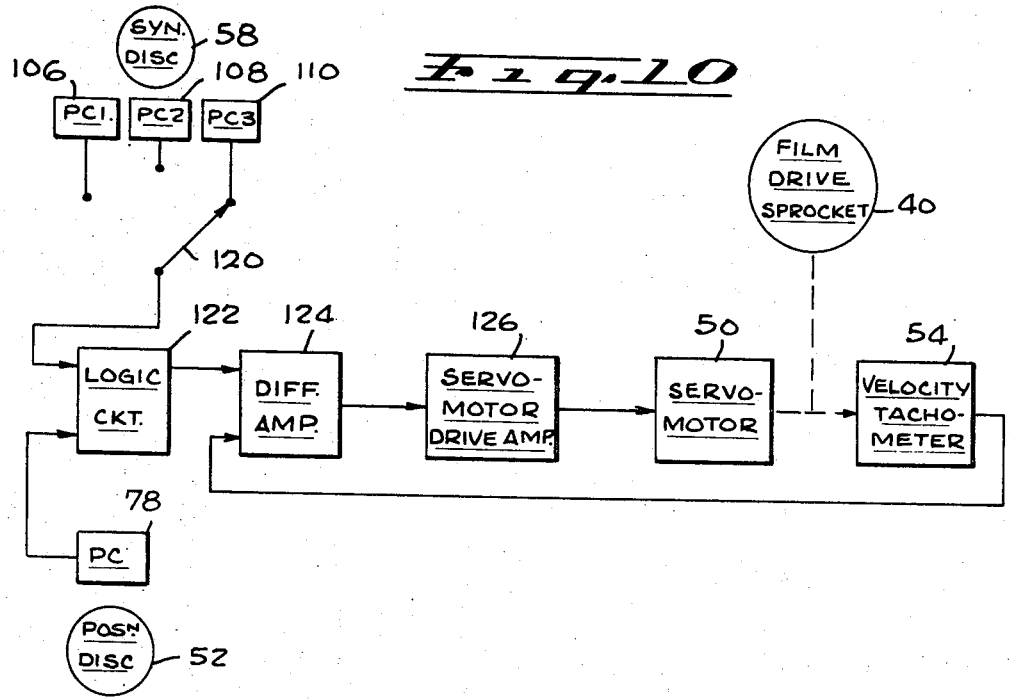
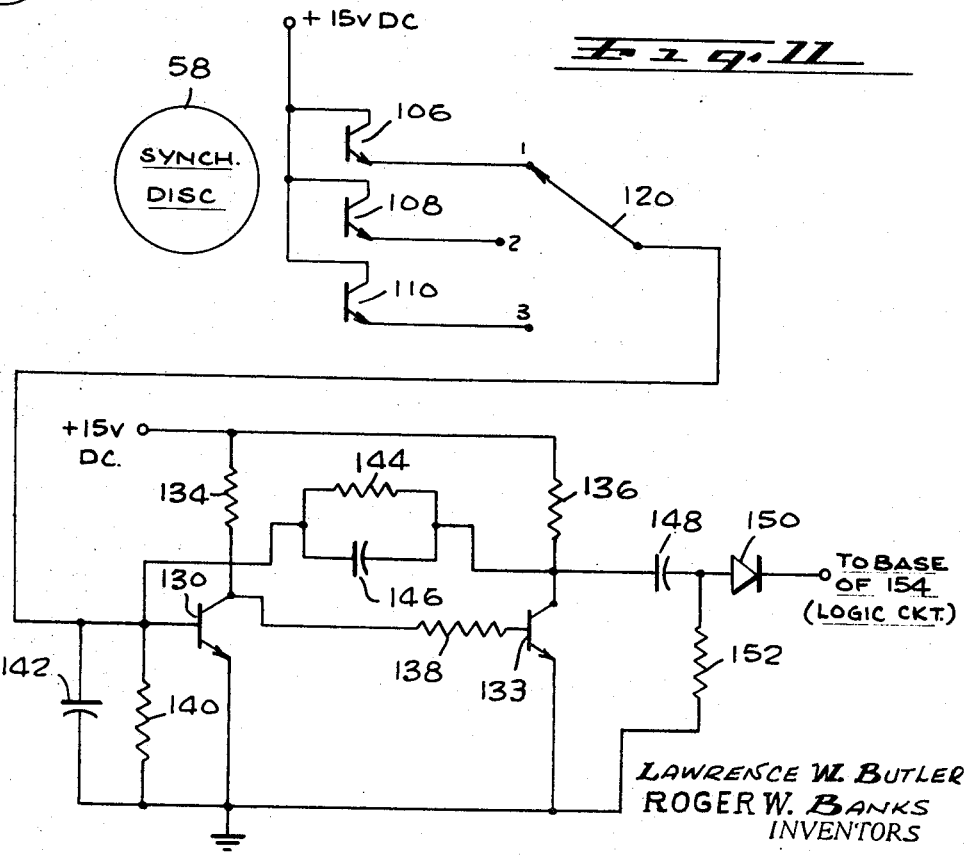

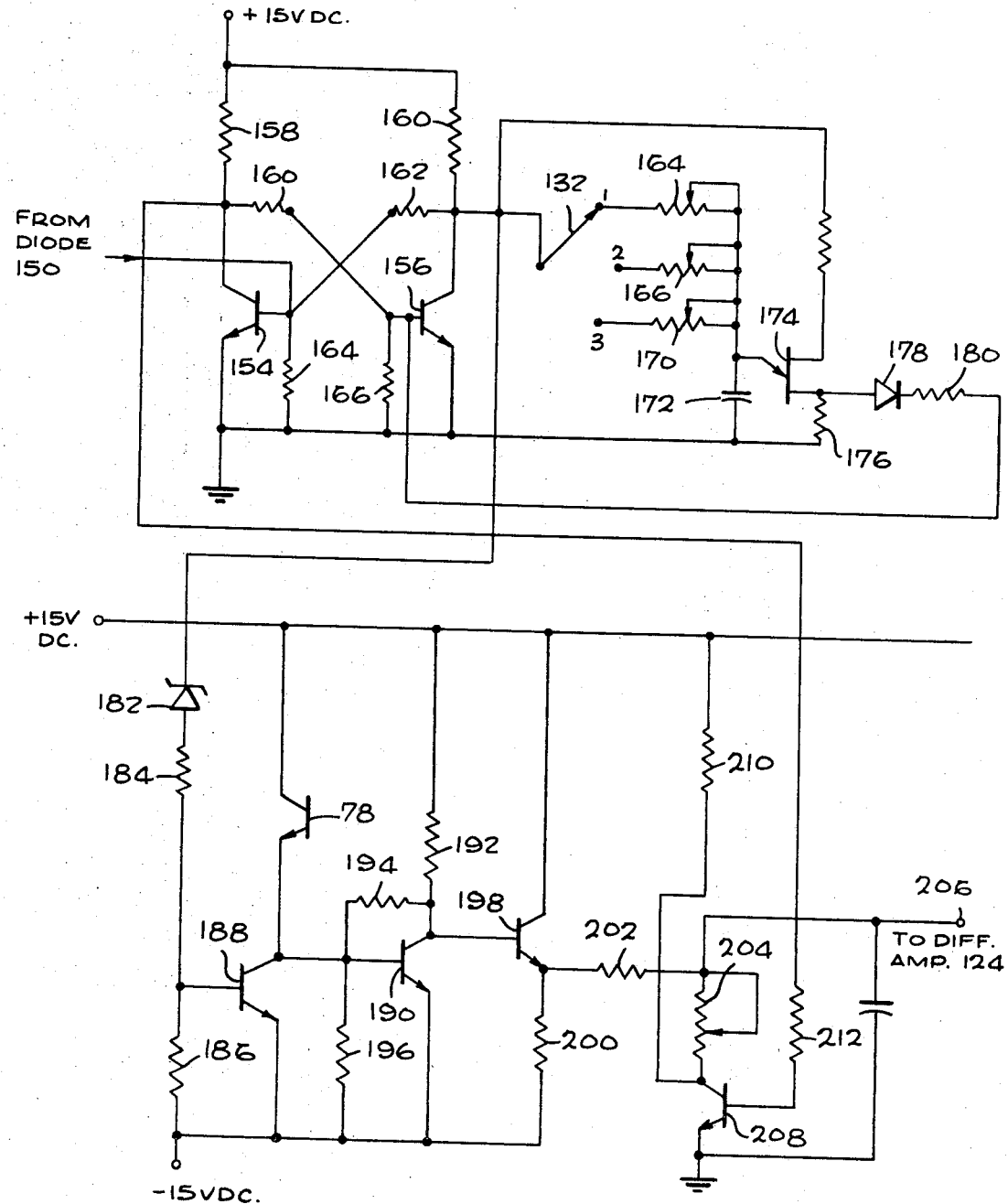

_United States Patent Office_

3,565,521
Patented Feb. 23, 1971

3,565,521
VARIABLE SIZE FILM FRAMING AND TRANSPORT SYSTEM
Lawrence W. Butler, 6180 Temple Hill Drive, Los Angeles, Calif. 90028, and Roger W. Banks, Costa Mesa, Calif.; said Banks assignor to said Butler
Filed Nov. 26, 1968, Ser. No. 778,942
Int. Cl. G03b 21/46, 21/48
U.S. Cl. 352—163                                        9 Claims

ABSTRACT OF THE DISCLOSURE

A film, having predetermined numbers of sprocket holes adjacent each film frame, is advanced by driving a sprocket wheel with a servomotor to pull the film frame by frame through a film gate. A train of motor drive pulses for each of different films is electrically generated. The train of motor drive pulses is changed and applied to the motor as the number of sprocket holes per frame changes for each of the different films.

BACKGROUND OF THE INVENTION

This invention relates to film transport systems and more particularly to improvements therein. The present practice in the motion picture industry is to take pictures which are to be viewed at the rate of 24 frames per second or 1440 per minute. Expressed in lineal footage, this means 1½ feet per second or 90 feet per minute of film is moved through a film gate. A frame of film has four sprocket holes allotted thereto along the side. Since 1953 a frame having an aspect ratio of 1.85 to 1 has also been used. This scheme reduces the frame picture area so that it occupies slightly less than 3 perforation spacing. However, in order to be able to use the same cameras and projectors which move film a distance of four sprocket holes in order to change film frames, the amount of film allotted to four sprocket holes is still used despite the smaller frame size. The unused picture area is wasted.

The present release print cost in Hollywood is estimated at 130 million dollars per year. It is most desirable to find a way to reduce the amount spent on film without spoiling the quality. One way of reducing the cost of film is to put more picture information on a given length of film. In view of the better film emulsions presently available one can do this without deteriorating picture quality. One can reduce the image area per frame and can use the proper lenses so that picture content and subsequent picture display are the same as are obtained with the present system.

Using four sprocket holes per film frame as an indication of the film length presently allotted per frame, one can go to a three sprocket hole allotment per picture frame, or even a two sprocket hole allotment per picture frame, thereby reducing film costs considerably.

However, the changes in the number of sprocket holes per picture frame require corresponding changes to be made in motion picture cameras and in the motion picture projectors. Systems have to be developed which maintain the 24 frames per second speed but which move less film in view of the reduced frame size. No one camera can be used for all three picture frame sizes, neither can any one projector be used for all three picture frame sizes presently known. During a transition period of going from the present system to those using smaller frame sizes, unless a film transport mechanism is provided which can handle different sprocket hole to frame ratios in the film, the increase in the numbers of camera and projectors required can very well prevent any advantage being taken of this expedient for reducing film costs. Furthermore, any new film transport mechanism must be able to handle present film in view of the large capital investment represented by motion pictures which are already made.

OBJECTS AND SUMMARY OF THE INVENTION

This invention solves the dilemma of the requirement for multiple projectors and/or cameras by providing a film transport mechanism which can be simply switched to handle any one of the films having different numbers sprocket holes per frame.

Another object of this invention is the provision of a novel and unique arrangement for enabling a single projector or camera to handle film having any film frame-to-sprocket hole ratio.

These and other objects of the invention are achieved by an arrangement wherein a synchronizing disc and photocell combination are provided which enables the selection of the electrical signals required for instructing a motor to rotate a distance required to pull down film a predetermined distance. The pull-down operation is past a light gate for a projector and past the light aperture for a camera. These will hereafter be collectively referred to as a film aperture gate. The predetermined distance is established by the distance between frames as indicated by the sprocket hole per film frame ratio. Selection of the number of the signals required to accomplish the predetermined motion is by means of switches. A slotted disc wherein the slots correspond with the sprockets on a sprocket wheel, which achieves the film pull-down, is used together with a photocell and a light, to provide information indicating the exact position of a frame in the film aperture gate. This information is used to properly position a film frame within the film aperture gate.

The novel features of the invention are set forth with particularity in the appended claims. The invention will best be understood from the following description when read in conjunction with the accompanying drawings.

BRIEF DESCRIPTION OF THE DRAWINGS

FIG. 1 illustrates different film frame-sprocket hole ratios.

FIG. 2 illustrates schematically, a motion picture camera and the location of a sprocket wheel which moves the film, in accordance with this invention.

FIG. 3 illustrates a film projector, with the location of a sprocket wheel which moves the film in accordance with this invention.

FIG. 4 is a schematic illustration of the location of the apparatus, in accordance with this invention, for transporting film past a light gate or light aperture.

FIG. 5 is an isometric view illustrating an embodiment of the invention.

FIG. 6 is a view in elevation illustrating the placement

3 of the sprocket wheel drive motor and positioning disc, which are employed with this invention.

FIG. 7 is a view in section along the lines 7—7 in FIG. 6 illustrating the positioning disc which is used with this invention.

FIG. 8 is a view in elevation illustrating the positioning of the synchronizing disc and its photocells, in accordance with this invention.

FIG. 9 is a view along the lines 9—9 of FIG. 8 and illustrates the details of the synchronizing disc.

FIG. 10 is a block diagram of the electrical system of this invention.

FIG. 11 is a circuit diagram of the logic circuits which operate in response to the outputs of photocells employed by the synchronizing disc and the positioning disc.

FIG. 12 is a circuit diagram of the remaining logic circuitry which is driven by the circuit shown in FIG. 11.

DESCRIPTION OF THE PREFERRED EMBODIMENTS

FIG. 1 illustrates the film frame-sprocket hole ratio which is presently employed together with the proposed new ones. The arrangement 10 employs four sprocket holes per film frame. A proposed new arrangement 12 employs three sprocket holes per film frame. Another proposed new arrangement 14, employs two sprocket holes per film frame. It will be appreciated that in order to maintain the presently favored 24 frames per second, the amount of film which is moved is reduced as the film frame image area is reduced. The problem that arises for conversion from one frame-sprocket hole ratio to another, is not so much the difference in the amount of film which is moved, as the requirement that each frame be positioned at the light gate for 1/24 of a second and then quickly moved to expose the next film frame for 1/24 of a second. A shutter is interposed between the light source and the film during the pull-down interval in order to block the light source during this time. The shutter mechanism is well known and operates off the film drive mechanism.

FIG. 2 is a schematic illustration of a motion picture camera. It contains the standard pay-out reel 16, with the film 18 passing over a first guide 20, and then through a film gate 22, extending to a sprocket wheel 24. The sprocket wheel 24 serves the function of moving the film through the film gate 22, and operates in accordance with this invention to permit the different film frame-sprocket ratio films to be employed. After the film passes by the sprocket wheel 24 it is directed by means of another guide 26, around a take-up reel 28.

FIG. 3 is a schematic representation of a projector. Here, the pay-out reel 30 pays out film 32 which passes over a first guide 34 and forms a loop. The film passes through a film gate 36 within which it is exposed to light from a source 38. On the bottom side of the film gate is a sprocket wheel 40, which in accordance with this invention, pulls the film through the film gate 36. Another guide 42 directs the film toward two other guides 44, 46 from whence the film is pulled up by the take-up reel 48.

FIG. 4 schematically illustrates the placement of the apparatus, in accordance with this invention, relative to the film gate and sprocket wheel shown in FIGS. 2 and 3. This is by way of illustration and should not be taken as the only way in which this invention may be placed to transport film. On the other side of the wall 51 of either the camera or the projector, on which the sprocket wheel 40 (or 24) is mounted, there is positioned, in accordance with this invention, a servomotor 50, which drives the sprocket wheel 40 (or 24). The servomotor 50 has a shaft which, on one side extends to carry the sprocket wheel 40, and on the other side drives a positioning disc 52, and terminates in a velocity tachometer 54. A constant speed motor 56 is used for driving the guide sprocket wheels 34, 42. The constant speed motor 56 also drives a disc containing a plurality of holes 58, hereafter called a synchronizing disc.

4

FIG. 5 is an isometric view of the mechanical layout of apparatus in accordance with this invention. The constant drive motor 56 is not shown here, but the shaft 59 driven therefrom rotates the synchronizing disc 58, a drive wheel 60, as well as the small sprocket wheel 42. A timing belt 62 is stretched between the drive wheel 60 and a second wheel 64. The second wheel drives a shaft upon which there is mounted the upper small sprocket wheel 34.

A bearing support disc 66, is supported by means of rods (only one of which is shown) 68. It holds bearings through which the shaft 59 from the motor 56 extends. The bearing support 66 also supports a bracket structure 70, in which the lamps and photocells which are associated with the synchronizing disc 58 are supported.

Another support disc 72 has mounted thereon bracket structure 74 which holds the photocell and light source which are operated in conjunction with the positioning disc 52. Control circuits 76 which operate the invention are also attached to the back wall. The wiring connections between the control circuits and the various other parts of the system are not shown in this diagram in the interests of preserving clarity in the drawing.

FIG. 6 is a view in elevation of the servomotor 50, the positioning disc 52, and the structure for holding them in position relative to one another. FIG. 7 shows the details of the positioning disc. The servomotor 50 is attached to the wall 51. The servomotor 50 has a shaft which extends to the sprocket wheel 40 on one side. On the other side it extends, through a bearing 73 which is held in the end section of servomotor 50, to a shaft coupling 53 which holds the positioning disc 52. The shaft of velocity tachometer 54 is attached to the driven shaft by a coupling 55.

Flanges 80, 82 are part of the housing of the servomotor 50 and extend outwardly toward the support disc 72. The disc 72 is held onto the flanges 80, 82 by screws, not shown. The knurled heads respectively 88, 90 are the outsides of the servomotor brush holders.

The disc also provides support for the bracket 74. A source of illumination 76 and a photocell 78, are supported by the bracket 74 on opposite sides of the positioning disc 52. The support bracket 74 is attached to the disc 72 by means of a tightening screw having a knurled head 92.

The positioning disc 52, as may be seen from FIG. 7, has a plurality of slots 94, at the outer periphery thereof. One of these slots is provided for each sprocket on the sprocket wheel. The sprocket wheel has 24 teeth at 15 degree increments. Therefore the positioning disc has 24 notches at 15 degree increments. The positioning of the photocell 78 and the light source 76 is established so that the "photocell" may see the light source through a slot. The amount of positioning disc material between slots is sufficient to completely block the photocell from the light source.

FIG. 8 shows the details of the structure adjacent the synchronizing disc 58. The bracket 70 supports the three light sources respectively 100, 102, 104, in a vertical alignment, opposite three vertically aligned photocells, respectively 106, 108, and 110. The light source and the photocells are positioned on opposite sides of the synchronizing discs 58. Six holes are provided on the synchronizing disc equally spaced on a circle which passes these openings between light source 100 and photocell 106. Eight holes are equally spaced around a circle on the disc, which causes them to pass between light source 102 and photocell 108. Twelve holes are placed on the diameter of a circle on the disc which causes these holes to be passed between light source 104 and photocell 110. Since the sprocket wheel has 24 sprocket teeth, in one revolution the sprocket wheel will move respectively six frames of four sprocket holes per frame, eight frames of three sprocket holes per frame and twelve frames of two sprocket holes per frame. This is how the number of holes in the synchronizing disc are determined.

A brief summary of the operation of the system to show the relationship between the various mechanical parts thus far described, is, that depending upon the frame-sprocket hole ratio, one selects the output from one of the three photocells, 106, 108 or 110. The pulses generated by the photocells associated with the synchronizing disc are converted into signals having a pulse width determined by the amount the servomotor has to rotate to move film to change from one frame to the next in the film gate. Since more frames of the two sprocket hole per frame film are moved per rotation of the sprocket wheel 40, one would select the light-photocell combination which generates twelve pulses from a single rotation of the synchronizing disc. For three sprocket holes per frame film one selects the light-photocell combination giving eight pulses, and for four sprocket holes per frame one selects the six pulses per rotation of the synchronizing disc.

The pulses generated by the selected photocell are converted to pulses with predetermined pulse widths and are applied to drive the servomotor 50. However, one must still insure that when the servomotor advances the film a distance required to place a succeeding frame in the light gate, the frame is correctly positioned in the light gate. Otherwise, one is likely to see portions of frames being projected. The positioning disc 52 insures proper positioning. The photocell associated therewith generates a signal, as long as a slot is between it and its light source, which is used to drive the servomotor until the motor stops at the correct position for positioning the picture frame within the film gate.

Electrical circuitry for accomplishing the foregoing operation is shown in block diagram form in FIG. 10. A selector switch 120 is employed to select which one of the photocells 106, 108, 110 is to be used with the particular film which is being projected or exposed. The pulse signals developed by the combination of photocell and synchronizing disc are applied to logic circuitry 122, to which there is also applied the output of the photocell 78, which operates in conjunction with the positioning disc. The resulting output signals from the logic circuits are applied as one input to a differential amplifier 124.

The other input to the differential amplifier is the output of the velocity tachometer 54. Thus, when the servo motor 50, is stationary, the velocity techometer provides no output. Accordingly, the output of the differential amplifier will be the signal received from the logic circuit 122. This is amplified by a servo motor drive amplifier 126, whose output is applied to the servo motor 50. As the servo motor comes up to speed, the velocity tachometer generates an output signal which opposes the output signal from the logic circuit. As the velocity tachometer output begins to increase, the differential and amplifier output begins to decrease and thus the velocity of the servo motor is limited to a value dependent upon the magnitude of logic input voltage. It should be noted that the servo motor, velocity tachometer loop, which includes the differential amplifier and the servo motor drive amplifier, are a well known arrangement and constitute equipment which is commercially purchasable. Accordingly, their details need not be described here.

The logic circuitry 122 is the circuitry shown in FIGS. 11 and 12. The photocells 106, 108 and 110 actually constitute photodiodes which are connected selectively, by means of the switch arm 120 to the base of a transistor 130. The circuitry comprising the transistor 130, a second transistor 133, and the circuit components associated therewith, constitute an arrangement for forming a square wave from the photodiode output, differentiating the square wave then permitting only the positive going leading edge to be applied to the subsequent circuit.

A resistor 134 connects the collector of transistor 130 to a 15 volt operating potential source. A resistor 136 connects the collector of transistor 133 to the operating potential source. The emitters of transistors 130 and 133 are connected to ground. The collector of transistor 130 is also connected through a resistor 138 to the base of transistor 133. The base of transistor 130 is connected to ground through a parallel connected resistor 140, and capacitor 142. The base of transistor 130 is connected to one side of a feedback network including a parallel connected resistor 144, and capacitor 146. The other side of this feedback network is connected to the collector of transistor 133. The collector of transistor 133 is connected to a differentiating network, including capacitor 148 and resistor 152, to a diode 150. The other terminal of this diode 150 is connected to the following circuitry of the logic circuits shown in FIG. 12.

In the quiescent state, transistor 133 is conductive and transistor 130 is non-conductive. Upon the application of a signal from one of the photodiodes, transistor 130 becomes conductive thereby causing transistor 132 to become non-conductive. The feedback circuit from the collector of transistor 133 to the base of transistor 130 speeds up the transition process, as a result of which the signal received from the photocell is given a steep leading edge. A short time after removal of the photocell input, the two transistors resume their quiescent states. The capacitor 148 and resistor 152 differentiate the signal generated by transistor 133. The diode 150 however passes only the positive going portion of the differentiated signal which is the leading edge.

In FIG. 12, transistors 154 and 156 are cross connected into the well known flip-flop configuration. The respective collectors of transistors 154 and 156 are connected to a 15 volt potential source through the respective resistors 158 and 160. The collector of transistor 156 is connected through the switch arm 132 to one of three terminals. The switch arm 132 is ganged with the switch arm 120 and assumes the same position. The respective first, second and third terminals of the switch arm 132 are respectively connected through three potentiometers 164, 166, 170, to a capacitor 172. These potentiometers establish the time required to charge the capacitor 172. When the capacitor attains a predetermined level, it causes the unijunction transistor 174, to which it is connected, to be rendered conductive. The unijunction transistor develops a signal across resistor 176, which is applied through diode 178 and resistor 180 back to the base of transistor 156 whereby it is rendered conductive thus causing transistor 154 to be rendered non-conductive.

The circuit described, consisting of the flip-flop with transistors 154 and 156 and the charging circuit for capacitor 172 and unijunction transistor 174 effectively is an arrangement for providing a pulse at the collector of transistor 156 having a width required to drive the servo motor 50 long enough to change from one film frame to the next in the film gate. Potentiometers 164, 166 and 170 respectively have their values adjusted such that the widths of each pulse of the respective six, eight and twelve pulses received for a cycle of synchronizing of each pulse of disc rotation in response to the holes seen by the respective photodiodes 106, 108, 110 cause a transport of respectively six frames, eight frames and twelve frames through the film gate.

When transistor 156 has its collector go high, it enables a voltage to be applied through a Zener diode 182, which is connected in series with resistors 184 and 186, to the base of transistor 188. The emitter of transistor 188 as well as the other end of resistor 186 are connected to a −15 volt potential source.

Now as long as Zener 182 passes voltage to the base of transistor 188, transistor 188 will conduct regardless of whether or not photodiode 78 is conductive. Transistor 190, which has its base connected to the collector of transistor 188, has its collector connected to the positive potential source through a resistor 192. A second resistor 194 is connected between the collector of transistor 190 and its base. A third resistor 196 is connected between the base of transistor 190 and the negative potential source.

The values of resistors 192, 194 and 196 are selected such that with photodiode 78 is a partially conducting state, in the standby condition of the system, the collector of transistor 190 is at substantially zero potential. Photodiode 78 forms a voltage divider with resistor 196. During standby, photodiode 78 is maintained sufficiently conductive to insure that zero potential appears at the collector of transistor 190. The standby state of photodiode 78 is achieved as a result of the feedback loop including the positioning disc 52 and the light 76. The servo motor will be brought to rest at the location at which it positions the positioning disc with enough of a notch between light source and photodiode to remove motor drive current. This happens when a potential is applied to the base of transistor 190 such that its collector is zero.

The emitter of transistor 198 is connected to a negative potential source through a resistor 200 and also through a resistor 202 to an adjustable resistor 204. The adjustable resistor is also connected to an output terminal 206. The other end of the adjustable resistor is connected to the collector of a transistor 208. The transistor emitter is connected to ground. The transistor collector is connected through a resistor 210 to the source of operating potential. The base of the transistor 208 is connected through a resistor 212 to the collector of transistor 154. When transistor 154 is non-conductive, transistor 208 becomes conductive. Thus, transistor 208 is rendered conductive after a pulse has been applied to the servomotor. Effectively the transistor 208 establishes a potential divider with resistors 202 and 204. Thus, when it is rendered conductive, it effectively connects one end of resistor 204 to ground and the output signal which is applied to the output terminal 206 from the emitter of transistor 198 is made lower than it is when a pulse is being generated in response to one of the synchronizing disc photodiodes. The utility of this will become clear as this discussion progresses.

It has previously been shown that in the quiescent state, the state of conduction in which transistor 190 is placed is such that its collector is substantially at zero potential. When transistor 188 is rendered conductive in response to a voltage applied from the flip-flop, consisting of transistors 154 and 156, a negative potential is applied to the base of transistor 190 causing its collector to go positive. In response thereto, the emitter of transistor 198, which is emitter follower connected, goes positive and a positive pulse is applied to the output terminal 206. This positive going pulse signal is applied to the differential amplifier 124 (shown in FIG. 10,) and thus serves to drive the servomotor. Since, as the servomotor rotates, the positioning disc is also rotating, photodiode 78 will alternatively be rendered conductive and non-conductive. This, however, has no effect on the conduction of transistor 190, as transistor 188 is maintained conductive in response to the potential received from the collector of transistor 156.

When the synchronizing disc pulse terminates, that is when the flip-flop consisting of transistors 154 and 156 is reset by the output from transistor 174, transistor 190 is still non conducting and its collector is still high. Drive current is still being applied to the motor. However, as soon as light through one of the notches in the positioning disc illuminates photodiode 78, it is rendered conductive whereby positive potential is applied to the base of transistor 190 causing it to become conductive and its collector to approach ground potential quickly thus turning off the drive current to the motor extremely rapidly. Also, at this time transistor 208 is rendered conductive thus reducing the potential being applied to the output terminal 206. Should for any reason, the servomotor overshoot the position at which a film frame is in the light gate, too much or too little light is applied to the photodiode 78 to bias transistor 190 to its quiescent, or zero output state with transistor 188 turned off, transistor 190 will be rendered more or less conductive and thus cause its collector to go positive or negative as required to cause the servomotor to rotate in the direction required to assure proper positioning of the film frame in the light gate. The photodiode 78 is partially illuminated in this position.

To summarize the operation of the electronic circuitry, a selected one of the photodiodes 106, 108, 110, as the synchronizing disc 58 rotates, produces output pulses which are converted into square waves by the circuitry including transistors 130 and 132. These are differentiated and the positive going portion of the differentiated square wave is applied through the diode 150 to the flip-flop consisting of transistors 154 and 156. The time during which the flip-flop remains in its set state in response to the output of diode 150, is determined by the combination of the capacitor 172, the resistor selected to permit charging current thereto, and the unijunction transistor 174. If a four sprocket hole per frame film is being transported, then the width of the pulse is sufficient to enable the servomotor to transfer a new frame in place of the old one in the film gate. Similarly, if a two sprocket hole per frame film is being handled then the width of the pulse is made smaller since the servomotor has to transfer less film to effectuate the substitution of a succeeding film frame for the one in the light gate.

Photodiode 78, the photodiode which is operated in conjunction with the positioning disc has no effect on a driving signal being applied to the servo motor while the flip-flop 154–156 remains in its set state. However, as soon as the flip-flop is reset, then it is rendered operative to immediately control the drive current to the servo motor and if necessary reverses the motion of the servo motor to insure that the film frame is properly positioned in the film gate. The network in which photodiode 78 is connected can also operate to apply drive current to the motor, in the event it has undershot the position required to properly position a frame in the film gate.

There has been described and shown herein a novel, useful and unique arrangement whereby a single projector or camera can be simply switched to handle films having different sprocket hole per film frame ratios. While the system has been described for handling two, three, or four sprocket holes per frame, it will be appreciated that from the principles described herein those skilled in the art can readily see how this can be altered for any desired number of sprocket holes per frame by changing the number of holes on the synchronizing disc together with the values of the resistors 164, 166 and 170 and capacitor 172.

The present method of allowing 1/24 second for both frame exposure time and frame transfer time is equivalent to 41 milliseconds. Of the 41 milliseconds, the actual frame exposure time in present motion picture cameras and projectors is 19 milliseconds and the transfer time is 22 milliseconds. The servo motor driven sprocket wheel of the present invention enables the transfer time to be reduced from 22 milliseconds to 5 milliseconds. The time saved by decreasing the transfer time can be allotted to the frame dwell time in the film gate, which can result in increasing exposure time from 19 to 36 milliseconds or almost doubling the brightness of the projected image, or doubling the exposure time in photography thereby making available an additional lens stop. The shutter, which is used in front of a lens in a camera, or a light in a projector, during transit time, is also made to reflect the reduced film transport time.

Although particular embodiments of the invention have been described and illustrated herein, it is recognized that modifications and variations may readily occur to those skilled in the art and consequently it is intended that the claims be interpreted to cover such modifications and equivalents.

What is claimed is:

1. A film transport system for pulling successive frames of film having predetermined numbers of sprocket holes adjacent each film frame through a film gate comprising:

a motor;

film advance means driven by said motor for pulling said film frame by frame through said film gate;

means for generating a train of motor drive signals for each of different films, each film having a different number of sprocket holes per frame for rotating said motor responsive to each of said signals through an angle required to cause said film advance means to move said film through said film gate the distance between frames;

means for selecting for a given film a train of motor drive signals for application to said motor; and means for applying the selected train of motor drive signals to said motor.

2. A film transport system as recited in claim 1, wherein said motor is a servomotor; and said film advance means is a sprocket wheel.

3. A film transport system as recited in claim 1 wherein said means for generating a train of motor drive signals for each of different films, each film having a different number of sprocket holes per frame, comprises means for generating a train of pulses at a frequency of 24 pulses per second each pulse having a width required to drive said motor through an angle required to cause said film advance means to move said film through said film gate the distance between frames.

4. A film transport system as recited in claim 1 wherein there is included a positioning means for generating a signal when a motor drive signal terminates representative of the improper position of a frame of film relative to said film gate and means for applying said positioning means signal to said motor to drive it until said frame of film is properly positioned within said film gate.

5. A film transport system as recited in claim 1 wherein said means for generating a train of motor drive signals includes a disc having a plurality of openings spaced around and defining the perimeters of each of successively larger radius circles, the number of circles being equal to the number of different sprocket hole to film frame ratio films desired to be handled, the number of holes around the perimeter of a circle being determined by the number of film frames to be transported for a cycle of rotation of said disc, means for rotating said disc in synchronism with the transport of said film, a photocell means for each of said circles for generating a pulse signal as an opening in said disc passes by a photocell means, a signal generating means for each of said photocell means each responsive to a pulse signal for generating a pulse signal having a different pulse width; and said means for selecting for a given film a train of motor drive signals for application to said motor includes switch means for selecting one of said photocell means and connecting it to one of said signal generating means.

6. A film transport system as recited in claim 4 wherein said positioning means includes a disc having a plurality of notches spaced around its periphery, there being a notch for each perforation of film to be transported through said film gate during one revolution of said disc;

photodiode means positioned adjacent said disc periphery having a resistance which varies inversely with the amount of notch opening opposite said photodiode means;

bias means to which said photodiode means is connected for generating a signal having a polarity determined by the resistance value of said photodiode.

7. A film transport system for pulling successive frames of film having predetermined numbers of sprocket holes adjacent each film frame through a film gate comprising:

sprocket wheel means engaging said film for pulling successive frames of film through said film gate;

servomotor means connected to drive said sprocket wheel means;

means for generating a pulse train wherein each pulse has a width which when applied to said servomotor means rotates it and said sprocket wheel means the distance required to transfer film through said film gate from one frame to the next, said means including:

a disc having a plurality of openings therein spaced around and defining the perimeter of a circle on said disc, the number of said openings being determined as the number of film frames to be transported through said film gate during a rotation of said disc;

photocell means positioned adjacent said disc openings for generating a pulse signal when each opening passes opposite to it;

means for converting each pulse signal output of said photocell means to a pulse having a width which when applied to said servomotor means rotates it and said sprocket wheel means the distance required to transfer film through said film gate from one frame to the next; and means for rotating said disc in synchronism with the transport of said film; and means for applying said pulse train to said servomotor means.

8. A film transport system as recited in claim 7 wherein there is included means for generating an error signal indicative of the malpositioning of a film frame within a film gate; and means for applying said error signal to said servomotor means for correcting the position of said film frame within said film gate.

9. A film transport system for pulling successive frames of film having predetermined numbers of sprocket holes adjacent each film frame through a film gate comprising:

sprocket wheel means engaging said film for pulling successive frames of film through said film gate;

servomotor means connected to drive said sprocket wheel means;

a disc having a plurality of openings therein spaced around and defining the perimeter of a circle on said disc, the number of openings being determined as the number of film frames to be transported through said film gate during the rotation of said disc;

photocell means positioned adjacent said disc openings for generating a pulse signal when each opening passes opposite to it;

means for converting each pulse signal output of said photocell means to a drive pulse having a width which when applied to said servomotor means rotates it and said sprocket wheel means the distance required to transfer film through said film gate from one frame to the next;

means for applying said drive pulse to said servomotor;

motor means for transporting film up to said film gate and for withdrawing film payed out by said sprocket wheel means;

means coupling said disc to said motor means to be rotated thereby in synchronism with the transport of said film; and positioning means for generating an error signal indicative of the malpositioning of a film frame within a film gate including a positioning disc rotatably driven by said servomotor means;

said positioning disc having openings spaced around its periphery, the number of openings equalling the maximum number of frames being transported through said film gate for a rotation of said positioning disc;

position photocell means positioned adjacent said openings for generating a positioning signal upon the termination of having a polarity determined by the area of an opening to which said position photocell means is exposed, and means for applying said positioning signal to said servomotor to drive it to correctly position said film frame in said film gate.

References Cited

UNITED STATES PATENTS

| | | | |
|---|---|---|---|
| 2,192,987 | 3/1940 | Runge | 352—163 |
| 2,605,673 | 8/1952 | Manderfeld | 352—163X |
| 3,288,550 | 11/1966 | Saraber | 352—180 |

LOUIS R. PRINCE, Primary Examiner

H. C. POST III, Assistant Examiner

U.S. Cl. X.R.

352—180